No. 849,288. PATENTED APR. 2, 1907.
J. F. THOMAS.
AUTOMATIC CLUTCH COUPLING FOR SHAFTS.
APPLICATION FILED APR. 13, 1906.
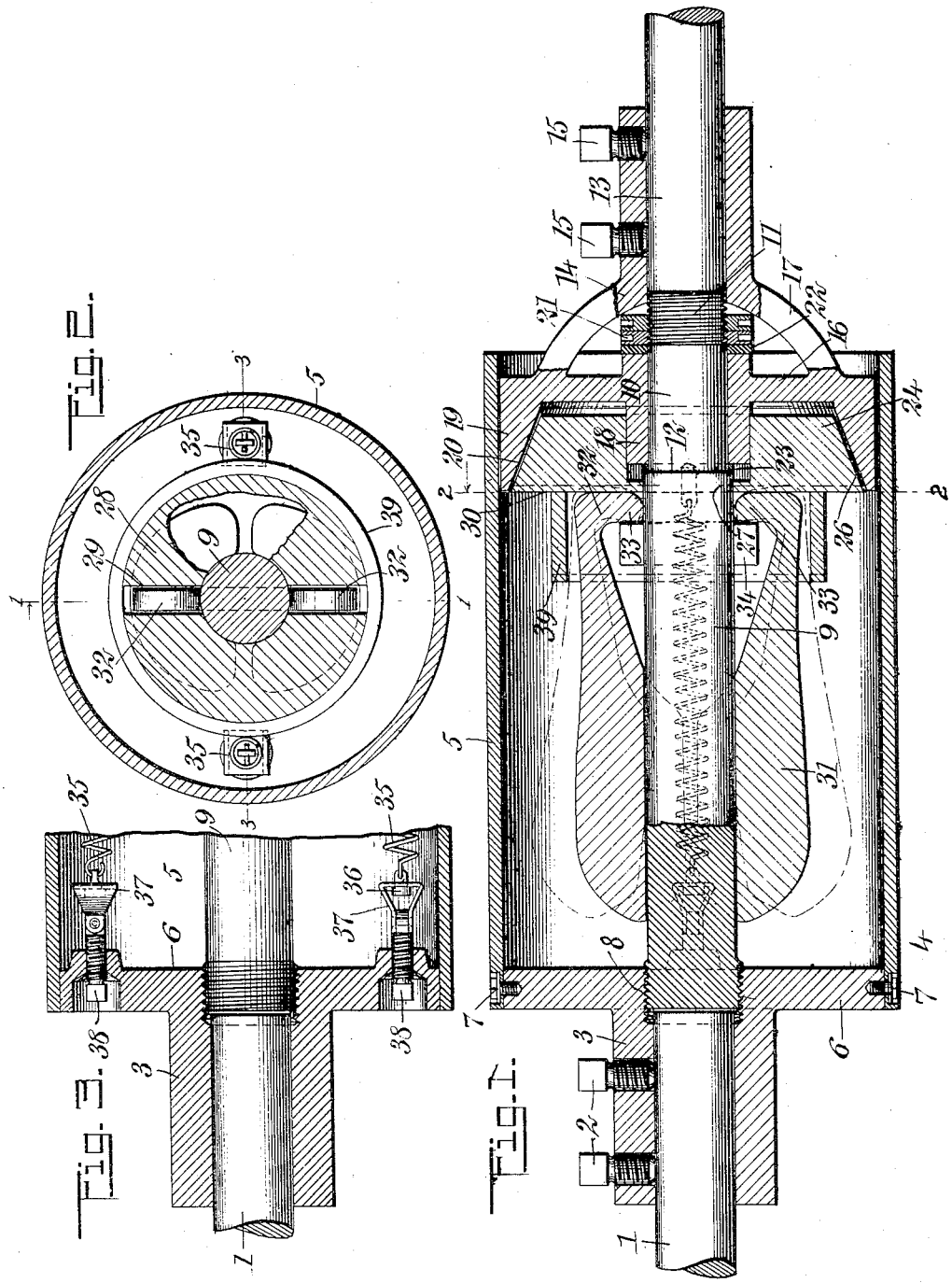
WITNESSES
INVENTOR
Jesse F. Thomas
BY Munn & Co
ATTORNEYS

UNITED STATES PATENT OFFICE.

JESSE F. THOMAS, OF NEW LONDON, WISCONSIN.

AUTOMATIC CLUTCH-COUPLING FOR SHAFTS.

No. 849,288.   Specification of Letters Patent.   Patented April 2, 1907.

Application filed April 13, 1906. Serial No. 311,495.

*To all whom it may concern:*

Be it known that I, JESSE F. THOMAS, a citizen of the United States, and a resident of New London, in the county of Waupaca and State of Wisconsin, have invented a new and Improved Automatic Clutch-Coupling for Shafts, of which the following is a full, clear, and exact description.

This invention relates to shafting; and the object of the invention is to produce a coupling adapted to be placed in driving-shafting which will be ineffective when the driving-shaft is rotating at low speed, but which will come into operation automatically when the speed is sufficiently increased.

The invention consists in the construction and combination of parts to be more fully described hereinafter and particularly set forth in the claims.

Reference is to be had to the accompanying drawings, forming a part of this specification, in which similar characters of reference indicate corresponding parts in all the figures.

Figure 1 is a longitudinal central section through the coupling. This section is taken on the line 1 1 of Fig. 2. Fig. 2 is a transverse section on the line 2 2 of Fig. 1, and Fig. 3 is a longitudinal section on the line 3 3 of Fig. 2.

Before proceeding to a detailed description of the invention it may facilitate the disclosure to state that the invention is especially applicable where it is desirable to start the engine or other prime mover before the load is taken thereby.

The invention is expected to be especially useful as a coupling in the line-shafting of launches, the object being to enable the engine to start before the propeller of the launch is caused to rotate.

Referring more particularly to the parts, 1 represents the projecting extremity of the engine-shaft. To this shaft there is rigidly attached by the set-screws 2 the hub 3 of a barrel or casing 4, the said barrel comprising a cylindrical shell 5 and a head 6, to which the same is removably attached by screws 7, as indicated. The said head 6 is integral with the hub 3, as shown. In its inner face the head 6 is provided with a threaded opening 8, which receives the threaded extremity of a coupling-shaft 9. This shaft extends longitudinally within the casing, as shown, and has a reduced neck 10 formed near the outer extremity thereof. The extremity of this neck is provided with screw-threads 11, as indicated in Fig. 1. By reason of the reduced neck 10 a shoulder 12 is produced on the coupling-shaft 9. The line-shaft 13, which leads to the propeller of the launch or to mechanism which is driven through the coupling, is in axial alinement with the coupling-shaft 9 and abuts against the threaded extremity thereof, as shown in Fig. 1. To this line-shaft 13 the clutch member 14 is rigidly attached by means of suitable set-screws 15, the said clutch member comprising a body 16, which is connected by radial arms 17 with the hub of the clutch member, as shown. This body 16 is formed at its center into a sleeve or hub 18 and is provided with a rim 19, which is formed with a conical bore 20, as indicated. This clutch member 14 is loosely mounted upon the neck 10 and is retained thereupon by means of spanner-nuts 21, which screw upon the threads 11, as indicated, a suitable washer 22 being placed against the base of the clutch member, as shown. The inner extremity of the clutch member 14 seats against a suitable washer or ring 23, which is disposed against the aforesaid shoulder 12.

Slidably mounted upon the sleeve 18 there is a second clutch member 24, which consists of a heavy disk having a conical face 26, which is adapted to seat in the conical bore 20 aforesaid. This disk 24 is formed with a central bore, which fits snugly upon the outer surface of the sleeve 18, as shown, and it is further provided with a contracted bore or opening 27, which fits the diameter of the shaft 9. The body 28 of the clutch member 24 is of reduced diameter, as shown in Fig. 2, and is provided with diametrically-disposed slots 29, which extend inwardly to the outer face 30 of the disk of the clutch member. These slots 29 receive the inner extremities of counterweights 31, which are disposed within the shell 5 on opposite sides of the shaft 9, as indicated. The extremities of these weights 31 are formed into heads 32, which rest against the face 30, and these heads are provided with toes 33, which project toward the shaft 9, as indicated. Just at this point the shaft 9 is provided with a transversely-disposed key or gib 34, and against the projecting extremities of this gib the toes 33 press.

As indicated most clearly in Fig. 3, within the casing 4 and on each side of the shaft 9 helical springs 35 are respectively attached. The forward extremities of these springs are attached in any suitable manner, as indicated in Fig. 1, to the clutch member 24, and they normally operate to keep the same out of engagement with the clutch member 14. In order to enable the tension of these springs to be adjusted, their forward extremities are connected to swivel-heads 36, mounted in stirrups 37, which stirrups attach to adjusting-screws 38, set in the head 6, as shown most clearly in Fig. 3.

It should be understood that when the engine-shaft 1 is rotating at a sufficiently high rate of speed the weights 31 will be thrown outwardly by centrifugal force. In order to hold the heads 32 in position, I provide a ring 39, which is preferably shrunk upon the body 28 of the clutch member 24. As the weights move outwardly the flat toes 33 rock slightly upon the shaft 9, which they engage, and the heads 32 operate to force the clutch member 24 toward the clutch member 14. In this way when a sufficiently high number of revolutions is reached the rotation of the clutch member 24 will be transmitted frictionally to the clutch member 14, and the shaft 13 will then be driven. In Fig. 1 the dotted lines illustrate the outward movement of the weights 31, and it will be seen that the outer sides of these weights will come against the forward or outer edge of the ring 39 in such a way that this ring will limit their movement, as suggested.

While I have referred in the specification to the shaft 1 as an "engine-shaft" and the shaft 13 as a "line-shaft," it should be understood that as the invention is used in other connections the shaft 1 may be considered simply as a driving-shaft, while the shaft 13 is a driven shaft. Furthermore, the coupling-shaft 9 may be considered as an extension of the engine-shaft 1.

Having thus described my invention, I claim as new and desire to secure by Letters Patent—

1. In a shaft-coupling, in combination, a clutch member adapted to be attached to a driven shaft, a shaft in alinement therewith, a second clutch member slidably mounted on said first clutch member and having slots therein, counterweights having heads received in said slots and having toes abutting the side of said shaft, and a projecting member carried by said shaft and engaged by said toes whereby the outward movement of said weights will advance said second clutch member.

2. In a shaft-coupling, in combination, a clutch member adapted to be attached to a driven shaft, a shaft alining therewith, a second clutch member slidably mounted on said shaft and having diametrically-disposed slots, a transverse gib mounted in said shaft and having its extremities projecting into said slots, weights having heads lying in said slots and having toes engaging the edge of said gib and the side of said shaft.

3. In a shaft-coupling, in combination, a clutch member adapted to be attached to a driven shaft, a shaft in alinement therewith, a second clutch member slidably mounted on said first clutch member and having slots therein, counterweights having heads received in said slots and having toes abutting the side of said shaft, a projecting member carried by said shaft and engaged by said toes whereby the outward movement of said weights will advance said second clutch member, and means for normally holding said second clutch member out of engagement with said first clutch member.

4. In combination, a driven shaft, a clutch member rigidly attached thereto, a driving-shaft, a casing rigidly attached to said driving-shaft and having a shell surrounding said clutch member, a second clutch member mounted within said casing and adapted to slide toward said first clutch member, said second clutch member having slots therein, said shaft having a transversely-disposed gib projecting into said slots, weights mounted in said case on each side of said shaft and having heads disposed in said slots, said heads having toes engaging the side of said shaft and the edges of said gib, said heads abutting the face of said second clutch member and affording means for advancing the same when said weights fly outwardly.

In testimony whereof I have signed my name to this specification in the presence of two subscribing witnesses.

JESSE F. THOMAS.

Witnesses:
MAT SCHMIT,
WM. NUSSBAUM.